(No Model.)
C. C. JOHNSON.
COMBINED BENCH DOG AND CLAMP.
No. 295,178. Patented Mar. 18, 1884.
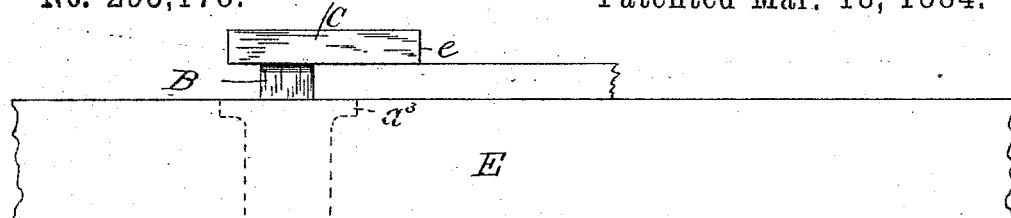
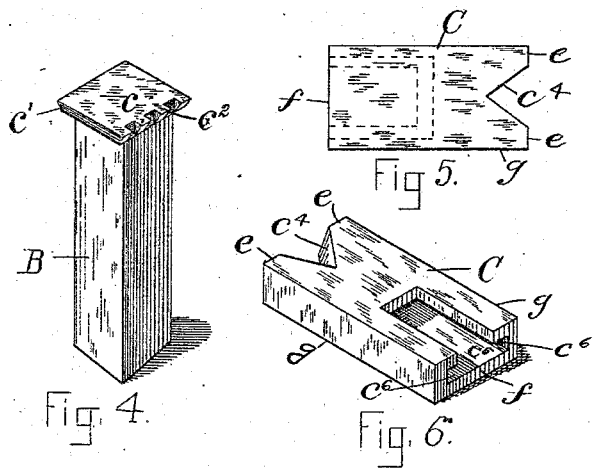
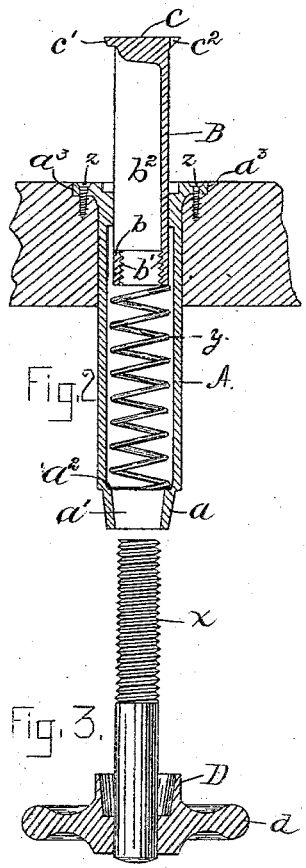
Witnesses:
Fred. Harris
Fred. P. Dolan
Inventor:
Charles C. Johnson
by Bowdoin S. Parker
his atty.

UNITED STATES PATENT OFFICE.

CHARLES C. JOHNSON, OF SPRINGFIELD, VERMONT, ASSIGNOR TO THE MILLER'S FALLS COMPANY, OF MILLER'S FALLS, MASSACHUSETTS.

COMBINED BENCH DOG AND CLAMP.

SPECIFICATION forming part of Letters Patent No. 295,178, dated March 18, 1884.

Application filed December 19, 1883. (No model.)

*To all whom it may concern:*

Be it known that I, CHARLES C. JOHNSON, of Springfield, in the county of Windsor and State of Vermont, a citizen of the United States, have invented a new and useful Improvement in Bench Hooks or Dogs and Clamps, of which the following is a full, clear, and exact description, reference being had to the accompanying drawings, forming a part of this specification, and in which like letters of reference indicate corresponding parts.

My improvement relates more especially to bench dogs and clamps used by carpenters and joiners. The dog is secured to the work-bench by screws or other means in the usual manner. By a novel arrangement of parts the head can be used as a clamp. The dog can also be readily depressed in its socket by pressure upon the head, and will resume its former elevation upon the removal of the pressure. I further make the dog and clamp with two heads—one fixed and the other detachable, the latter adapted to be removably secured to the former. I also provide for vertical adjustability irrespective of the actuating mechanism; also for a positive vertical adjustability by the use of a direct-acting screw, all of which I hereinafter explain.

Figure 1 represents a vertical elevation of my invention. Fig. 2 represents a sectional elevation of the dog and holder and intermediate parts. Fig. 3 represents the screw. Fig. 4 represents an elevation in perspective of the fixed head of the dog and the shank of same. Fig. 5 represents a top view of the removable dog-head. Fig. 6 represents in perspective the under side of the removable dog-head.

Referring to Fig. 1, A is the socket provided with a projecting top, $a^3$, although said projecting top is not essential. The socket is inserted in the work-bench and secured in place by the screws $z\ z$ or other suitable means. The socket is made hollow, with a cavity, preferably square, extending downward from the top, as shown in Fig. 2. The top is further enlarged to receive the fixed head $c$, and the bottom of the socket is narrowed into the neck $a$, by which means the shoulder $a^3$ is formed inside the socket, and upon which shoulder rests the bottom of the spring $y$. The dog-head proper consists of two parts—first, of the fixed head $c$ and the shank B; second, of the removable head C, used in connection with the fixed head $c$. The shank B is fitted to the opening or orifice formed in socket A, including the fixed head $c$. The shank B is also made hollow, except at its lower extremity, which is made solid, as indicated by $b$, having the threaded orifice $b'$. The bottom of the shank B rests upon the spring $y$. The shank is actuated vertically by means of the screw-threaded spindle $x$ and handle $d$. The said spindle $x$ passes up through the opening $a'$ in the socket and through the spiral spring $y$, and is threaded in the bottom of the shank B at $b'$. The screw-spindle $x$ and the threaded orifice $b'$ are thus inclosed in the hollow socket A, and the upper extremity of the screw-spindle is also inclosed in the hollow shank. Thus the wearing parts of the actuating mechanism are fully protected from dirt and dust and external injury. The hook or dog proper is formed of the fixed head $c$, which is made square, with an undercut bevel upon all sides, (indicated by $c'$,) and with teeth arranged upon one side, (indicated by $c^2$;) also, of the detachable head C, which is made oblong in shape, as shown in Fig. 5. The head C has a V-shaped opening at one end, the bevel of which is undercut from the top face, as indicated by $c^4$.

Upon the under side of head C are formed the opening $c^5$ and overlapping shoulders $c^6\ c^6$. This opening fits the shank B, and the shoulders the edges of head $c$, so that the head C can be easily and securely attached or slid upon the head $c$ from either side of head $c$. By this novel arrangement the head $c$ can be used, or the adjustable head C, with its end $f$, or V end $e$, or sides $g$, according to the work required to be held upon the bench.

It will further be seen that with the adjustable head C removed another most important element is to be found in the operation of the direct mechanism connected with the shank which supports the heads. The screw-spindle $x$ being inserted in shank B through threaded orifice $b'$, it will be seen that by turning the handle or hand-wheel $d$, actuating the screw-spindle $x$, the shank B is adjusted vertically. The object of the spring $y$ is to support the heads and shank B, also the actuating screw-spindle $x$ and its attachments. Indeed, without the spring $y$ the device would be inoperative.

Having adjusted the dog to any desired height above the socket-top $a^3$, and desiring to temporarily use the bench without the dog, the board or plank or other substance to be worked upon can be placed upon the bench without regard to the dog, as it is obvious that upon a slight pressure being placed upon the top of the head it will be depressed, the head $c$ entering its place in the top of the socket A. As soon as the pressure is removed, the spring $y$ at once forces the head upward to its original position. The shank B, being square, can be inserted in the socket A, so as to present either side of the head $c$ to the work. I do not, however, confine myself to a square shank, B, nor to the exact details of construction shown and described as to other parts, as I am aware modifications may be made without departing from the spirit of my invention. The solid portion $b$ of the shank B is threaded to fit the screw $x$. The part $b$ therefore is in effect a fixed nut, which, co-operating with the screw $x$ and spring $y$, forms the mechanical means for adjusting the dog, or dog and clamp, as described.

The bench hook or dog and clamp herein described is preferably made of iron, steel, or other metal. As a clamp the removable head C is drawn downward by the screw-spindle $x$ and its nut, the work to be held being placed between the head C and the face of the work-bench, as indicated by Fig. 1. By this arrangement the workman has always in position the ordinary dog or a serviceable clamp, as required. It can even be employed as a clamp and also as a dog at the same time.

I am aware that a spring and screw have been employed before in connection with a bench-dog—as, for instance, in patent to H. J. Skinner, where the shank of the dog is extended below the socket and made into a screw-bolt, and provided with a nut upon the bottom. This is not my invention, as I carefully protect the working parts of my actuating mechanism both from violence and from dust and dirt by inclosing them inside the socket. The socket also incloses and protects and supports the shank of the dog its whole length, all of which features, as described, I deem valuable improvements upon anything known to me.

Having now fully described my invention, what I claim, and desire to secure by Letters Patent of the United States, is—

1. The bench-dog herein described, consisting of the removable head C, fixed head $c$, with hollow shank B, socket A, and screw-spindle $x$, the said shank, spring, and spindle inclosed in socket A, and all arranged, adapted, and combined as and for the purposes specified.

2. A bench-dog provided with a removable head, adapted to be used as a bench-clamp, and arranged to be at all times vertically movable in relation to the face of the bench, irrespective of the actuating mechanism, for operating the said head as a clamp, substantially as and for the purposes set forth.

3. In a bench hook and dog, a head provided with a hollow shank having a threaded orifice near the bottom, the said shank fitted to a hollow socket and supported by a spring, and adapted to be actuated vertically by a screw-spindle, substantially as and for the purposes set forth.

4. A bench hook or dog provided with a hollow socket and hollow shank, the sides externally interchangeably fitted to said socket, and having an independent actuating screw-spindle adapted to be operated from the bottom to adjust the said shank and its attachments vertically, the said shank and its adjusting mechanism supported by a spring, all combined substantially as and for the purposes set forth.

5. In a bench hook or dog, the combination of the hollow socket A, with shoulder $a^2$, the hollow shank B, provided with the threaded orifice $b'$ and with head $c$, adapted to be inserted in said socket A, so that either side of head $c$ may be presented to the work, and the spring $y$ and independent screw-spindle inclosed in socket A, for adjusting the head $c$ and shank B vertically, all substantially as and for the purposes set forth.

6. In a bench hook or dog, the head $c$, formed square, with undercut bevel $c'$ upon all sides, in combination with the removable head C, provided with the opening $c^5$ and overlapping shoulders $c^6$ $c^6$, adapted to fit the head $c$, substantially as and for the purposes set forth.

7. In a bench hook or dog, a removable head, in combination with a fixed head attached to a shank fitted to a socket, and adapted to be depressed to the surface of the bench by means of pressure upon the said removable fixed head, and adapted to resume its former vertical elevation upon the removal of said pressure, substantially as and for the purposes set forth.

8. The combination of the bench E with the head of a bench-dog adapted to act as a clamp, and be used in either direction, the said bench-dog and head being actuated vertically by suitable mechanism, substantially as and for the purposes specified.

9. The removable head C, formed oblong in shape, with the V-shaped opening at one end, the sides of said V being beveled under from the top face to the bottom, and having suitable provision for readily securing and removing the same from the fixed head $c$, substantially as and for the purposes set forth.

10. In a bench dog or clamp, a head provided with a square hollow shank, the sides of said shank interchangeably and removably fitted to a socket, said shank supported by a spring, and adapted to be actuated vertically by means of a nut and a screw-spindle, operated from below the socket, said spindle and nut being inclosed and protected from injury and dirt by the said socket, substantially as specified and described.

11. In a bench dog or clamp, the heads C c, the latter provided with the shank B, spring y, the said shank and spring inclosed in the socket A, the said heads and shank adapted to be actuated vertically from beneath the bench by an independent screw-spindle and nut, said spindle and nut inclosed in socket A, in combination with the bench E, substantially as and for the purposes set forth.

12. A removable head arranged to be attached to a bench-dog, and operated vertically in relation to the surface of the bench as a clamp by suitable mechanical means applied to the bench-dog, substantially as specified and set forth.

CHARLES C. JOHNSON.

Witnesses:
JEROME W. PIERCE,
FRANK B. PIERCE.